United States Patent
Williams et al.

(10) Patent No.: US 7,919,018 B2
(45) Date of Patent: Apr. 5, 2011

(54) PHOTOACTIVE TAGGANT MATERIALS COMPRISING SEMICONDUCTOR NANOPARTICLES AND LANTHANIDE IONS

(75) Inventors: George M. Williams, Portland, OR (US); David M. Schut, Philomath, OR (US)

(73) Assignee: Voxtel, Inc., Beaverton, OR (US)

( * ) Notice: Subject to any disclaimer, the term of this patent is extended or adjusted under 35 U.S.C. 154(b) by 97 days.

(21) Appl. No.: 12/290,643

(22) Filed: Oct. 30, 2008

(65) Prior Publication Data
US 2009/0224218 A1    Sep. 10, 2009

Related U.S. Application Data

(60) Provisional application No. 60/983,674, filed on Oct. 30, 2007, provisional application No. 61/068,213, filed on Mar. 4, 2008.

(51) Int. Cl.
| | |
|---|---|
| F21V 9/04 | (2006.01) |
| F21V 9/06 | (2006.01) |
| G02B 5/22 | (2006.01) |
| G02B 5/26 | (2006.01) |
| F21V 9/00 | (2006.01) |
| G02B 5/02 | (2006.01) |
| G02C 7/10 | (2006.01) |
| G02F 1/361 | (2006.01) |
| G03B 11/00 | (2006.01) |

(52) U.S. Cl. ........ 252/587; 252/582; 252/588; 436/172; 436/537; 65/60.2; 65/60.5; 65/99.2

(58) Field of Classification Search .......... 252/587, 252/582, 588; 436/537, 172, 94; 65/60.2, 65/60.5, 99.2
See application file for complete search history.

(56) References Cited

U.S. PATENT DOCUMENTS

| 7,096,692 B2 * | 8/2006 | Greenberg et al. ............ 65/60.2 |
| 2008/0107606 A1 * | 5/2008 | Grotjahn et al. ............... 424/9.3 |
| 2008/0194044 A1 * | 8/2008 | Faris et al. .................... 436/537 |

* cited by examiner

Primary Examiner — Ling-Siu Choi
Assistant Examiner — Bijan Ahvazi
(74) Attorney, Agent, or Firm — Lumen Patent Firm

(57) ABSTRACT

This invention provides, in one aspect, a procedure to use optically transparent nanocrystalline quantum dots to absorb UV light. This absorption process leads to an energy transfer to a chemically bound and chelated lanthanide ion that may emit light in either the visible spectrum (400-700 nm) or in the near infrared (700-1600 nm). This invention also provides methods for the use of these taggant materials in inks and aerosols used to disperse the taggant.

6 Claims, 5 Drawing Sheets

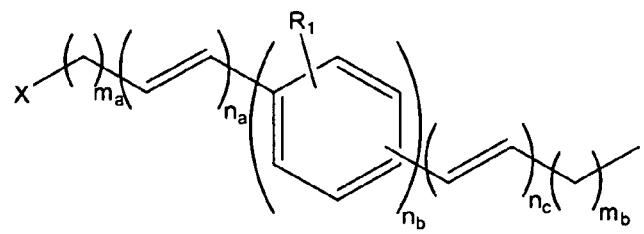
*Fig. 2A*
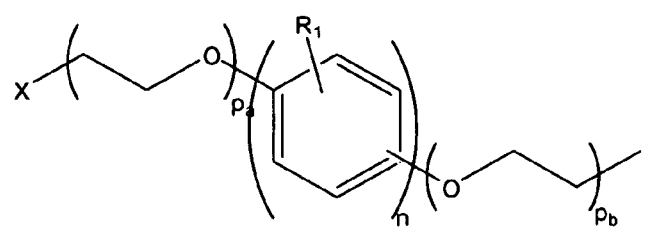
*Fig. 2B*
*Fig. 3A*
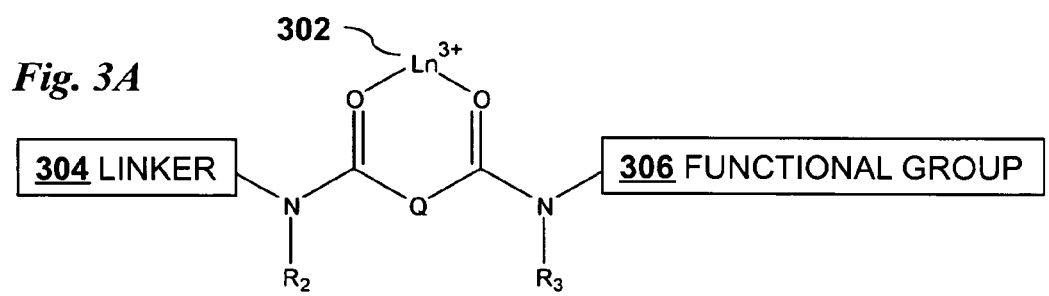
*Fig. 3B*
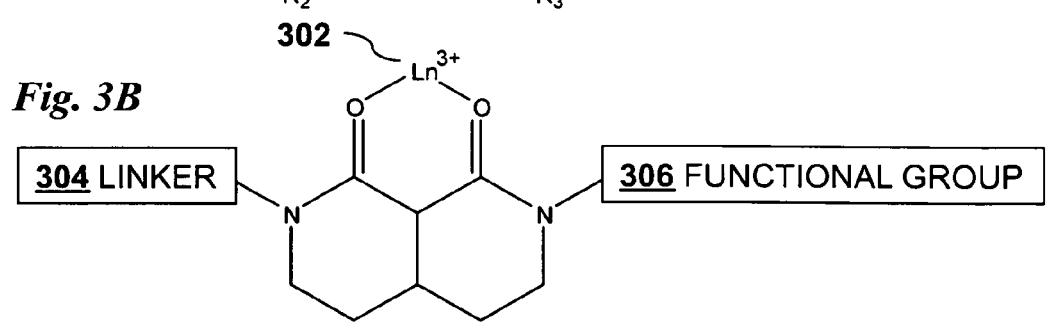

$R_4 =$
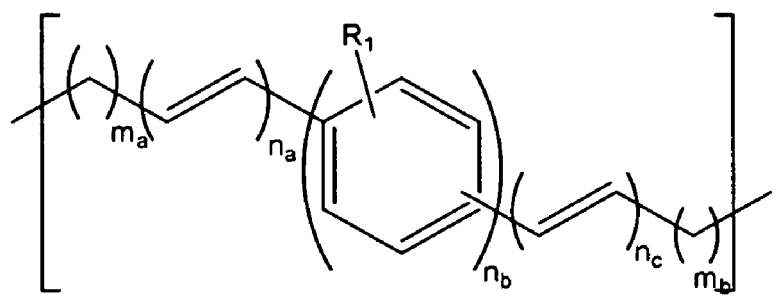
*Fig. 4A*
*Fig. 4B*
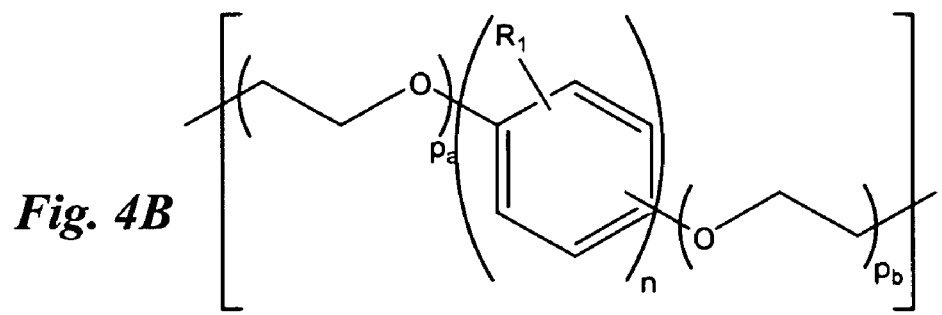

PHOTOACTIVE TAGGANT MATERIALS COMPRISING SEMICONDUCTOR NANOPARTICLES AND LANTHANIDE IONS

CROSS-REFERENCE TO RELATED APPLICATIONS

This application claims priority from U.S. Provisional Patent Application 60/983,674 filed Oct. 30, 2007, and from U.S. Provisional Patent Application 61/068,213 filed Mar. 4, 2008, both of which are incorporated herein by reference.

STATEMENT OF GOVERNMENT SPONSORED SUPPORT

This invention was made with Government support under contract W911NF-06-C-0121 and contract N00014-06-M-0332 awarded by the Army Research Laboratories and the Office of Naval Research, respectively. The US Government has certain rights in this invention.

FIELD OF THE INVENTION

The present invention relates generally to photoactive taggant materials. More specifically, it relates to photoactive taggant materials containing semiconductor nanoparticles and lanthanide ions.

BACKGROUND OF THE INVENTION

Taggant materials have many applications including product identification, authentication, anti-counterfeiting, and encryption. Some known materials used as taggants include nanoparticles, birefringent materials, luminescent dyes, inks doped with magnetic or trace elements, holographic sheets, and radiofrequency identification (RFID) tags.

Although RFID tags can encode a significant amount of information, costs of these devices can be high, limiting their use to high value product tracking. They are also not suitable for covert tagging applications. Similarly, holographic images are used for high value product authentication and anti-counterfeiting. Again, price constraints limit the use of these materials. Birefringent material taggants are useful for product registration where a database of patterns has been established and where patterns are almost impossible to reproduce. However, these materials have a rotational and translational sensitive readout process which makes digital encoding or encryption virtually impossible.

Doped inks are standard inks that have been doped or impregnated with either an active material (such as magnetic particles) or with a trace element of a specific concentration. The first type of doped inks are usually absorptive in the visible spectrum and are not ideal for high security ink applications. On the other hand, the second type requires destructive testing techniques, limiting this application significantly.

Luminescent dyes are typically used for ultraviolet to visible wavelength conversion or for visible to near infrared wavelength conversion. However, they generally have inadequate absorption and emission properties. Different excitation sources are also necessary to access a mix of multiple luminescent molecules and the emission spectra are broad and asymmetric, making the retrieval of information difficult. Additional problems that may arise include possible interactions between two different luminescent molecules, immiscibility of multiple luminescent molecules in a common matrix or solvent, and the inherent instability associated with dye-based chromophores used under extreme environmental conditions.

Nanoparticle taggants typically use CdSe, CdS, PbSe, PbS or similar nanocrystalline quantum dot material. These materials emit either in the visible spectrum or in the near infrared spectrum upon excitation with an appropriate light source. While the level of encryption obtained with these materials can be extremely high, there are three major problems associated with use of these materials for security ink applications: 1) The materials are not solar blind and have an absorption in the visible spectrum, which ensures that these materials will emit under standing lighting conditions. This makes the inks generated using these materials conspicuous. 2) To hide these materials, black inks must be used to cover up the areas where these materials have been deposited. This in turn limits the applications where they may be used, especially in regards to covert applications or high-security applications, or even in areas where aesthetics of the graphic images or packaging may come into play. Use of Cd, Se, and Pb have adverse environmental consequences and limits the use of these elements to high value documents of a lasting nature.

SUMMARY OF THE INVENTION

In one aspect, the present invention provides a photoactive taggant material composed of a first material, a linker compound bonded to the first material, a chelator compound covalently bonded to the linker compound, a second material bonded to the chelator, and a functional group bonded to the chelator compound. The first material is composed of a wide-gap semiconductor nanoparticle that exhibits absorption of non-visible light. The second material is composed of a lanthanide ion that exhibits emission of light. The functional group provides chemical functionality to the photoactive material. The linker compound and chelator compound each exhibits no absorption of UV, NIR or visible light and participates in a transfer of energy from the first material to the second material. The transferred energy is derived from the non-visible light absorbed by the first material. The functional group exhibits no absorption of UV, NIR, or visible light, and does not inhibit the emission of light exhibited by the second material.

Preferred embodiments may have one or more of the following additional features: the first material may exhibit absorption of ultraviolet light; the wide-gap semiconductor nanoparticles may be composed of metal oxide nanoparticles; the second material may exhibit emission of non-visible light; the second material may exhibit emission of near-infrared light; the linker compound may be an organic molecule such as a hydrocarbon or an oxyhydrocarbon.

BRIEF DESCRIPTION OF THE DRAWINGS

FIGS. 2A and 2B are chemical structures for two alternative linker portions of a taggant material according to an embodiment of the present invention.

FIGS. 3A and 3B are chemical structures for two alternative chelator portions of a taggant material according to an embodiment of the present invention.

FIGS. 4A and 4B are chemical structures for portions of two alternative functional groups of a taggant material suitable for inkjet deposition according to an embodiment of the present invention.

DETAILED DESCRIPTION

Figure 1:
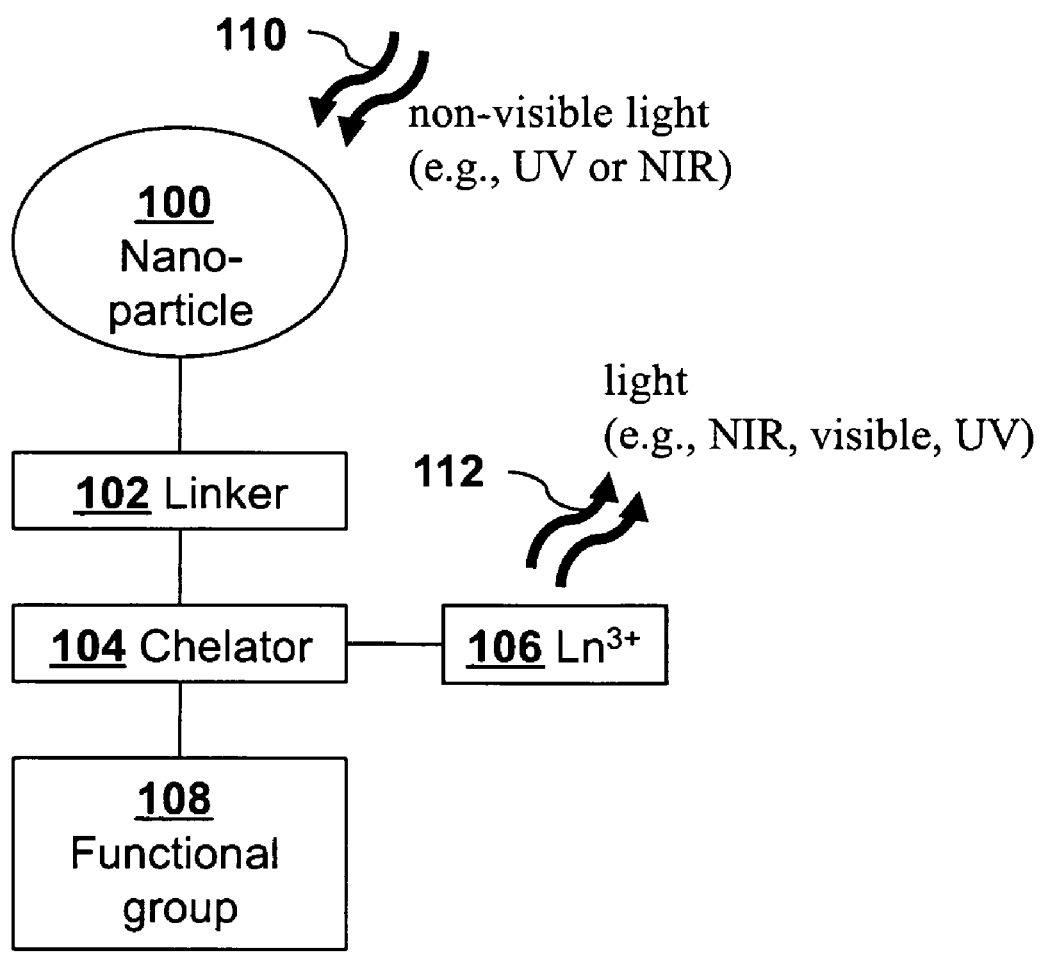
FIG. 1 is a schematic diagram of a taggant material according to an embodiment of the present invention.

In another aspect, the present invention provides materials useful as solar-blind security inks. Furthermore, ligand design centered around the near infrared emitting moiety permits utilization of this material in a wide variety of other applications.

Security inks typically operate by irradiation (interrogation) followed by detection or readout of light emitted by the ink in response to the interrogating light. Solar-blind (SB) security inks have the property that the light used for interrogation and/or readout are invisible (i.e., in the UV or IR portions of the spectrum). Although these inks are desirable, the prior art has not overcome some of the challenges that remain in this area.

For UV SB interrogation and UV readout—metal oxide quantum dots ($TiO_2$, $CeO_2$, ZnO, $SnO_2$, etc.) tend to be strongly absorbing, but poorly emitting materials. Their emission properties are typically dominated by defects within the material lattice, which in a nanoparticle is statistically a small aberration that will not contribute significantly to the optical properties of the nanoparticle itself. Another limiting factor in the use of a UVSB interrogation with a UV readout scheme is the direction in which technology is moving. While it may be possible to place materials onto the surface of the $MO_x$ (metal oxide) nanoparticle surface through various methods, the wavelengths of interest are not suitable for use with currently equipped NIR sensitive night vision devices (goggles, cameras, etc.).

On the other hand, there are materials that luminescence intensely in the near infrared region of the spectrum—such as the lanthanide ions of $Yb^{3+}$ (ytterbium), $Er^{3+}$ (erbium), $Ho^{3+}$ (holmium), $Tm^{3+}$ (thulium) and $Nd^{3+}$ (neodymium). The problem with these materials by themselves is that they have very poor absorption capabilities, meaning very intense light must be used in order to activate them efficiently for emission.

The materials of the present invention couple metal oxide materials with ligated lanthanide ions (specifically $Ho^{3+}$, $Tm^{3+}$, $yb^{3+}$, $Er^{3+}$ and $Nd^{3+}$) in order to use the capabilities of both materials to create a system where UVSB interrogation with NIR readout is possible. By using the strong UV absorbing properties of these metal oxides followed by concomitant energy transfer to a covalently bound lanthanide ion, emission may be obtained in the NIR region of the spectrum.

Furthermore, because of quantum confinement effects associated with nanoparticles, use of metal oxide nanoparticles of various sizes may promote the activation of a given set of materials in exclusion of other materials, increasing the level of complexity associated with encryption. Gated access (access dependent upon level of clearance for decryption technologies) is possible with this solution. The following different types of security may be provided by these materials:

1) Solar-blind (cannot be seen or activated in the visible spectrum).

2) Standard encryption technologies based on symbols or various coding techniques.

3) Activation of a select number of nanocrystalline quantum dot metal oxide materials that is dependent upon the size of the nanocrystal.

4) Readout at different wavelengths depending on the type of lanthanide used as an emitter.

A photoactive taggant material according to an embodiment of the invention is shown schematically in FIG. 1. The taggant is composed of a first material 100, a linker compound 102 bonded to the first material, a chelator compound 104 covalently bonded to the linker compound, a second material 106 bonded to the chelator, and a functional group 108 bonded to the chelator compound. Non-visible light 110 is absorbed by the first material, its energy is transferred through the linker 102 and chelator 104 to the second material 106 and converted by second material 106 into emitted light 112.

Nanoparticle

The first material 100 is composed of a wide-gap semiconductor nanoparticle that exhibits absorption of non-visible light 110. Preferably, the wide-gap semiconductor nanoparticle is composed of a metal oxide nanoparticle that exhibits absorption of ultraviolet light or near-infrared light.

Metal oxide nanoparticles ($MO_x$ NQD) may be synthesized as the naked metal oxide nanoparticle or even stabilized through ligand coordination. They are also commercially available from a number of vendors who can supply according to size and dispersion needs. Such vendors include, for example, Applied NanoWorks, Rensselaer, N.Y.; Integran, Pittsburgh, Pa.; American Elements, Los Angeles, Calif.; Meliorum Elements, Rochester, N.Y.; NanoScale Materials, Manhattan, Kans.; Nanostructured & Amorphous Materials, Los Alamos, N.Mex.; Nanophase Technologies Corporation, Romeoville, Ill.; Advanced Nanotechnology Limited, Welshpool, Australia; Inframat Advanced Materials, Farmington, Conn.; NanoProducts Corporation, Longmont, Colo.; Kemco International Associates, St. Pete, Fla.; Sigma-Aldrich, St. Louis, Mo.

The metal oxide nanoparticle may be any of various known metal oxide semiconductor materials such as, for example, $TiO_2$, $SnO_2$, ZnO, $CeO_2$, $In_2O_3$, $Y_2O_3$, $NaYF_4$, $LaF_3$, $YVO_4$, $Gd_2O_3$, and doped versions of these nanoparticles. Dopants may consists of, but are not limited to: $Mn^{2+}$, $Nd^{3+}$, $Ho^{3+}$, $Ce^{3+}$, $Eu^{3+}$, $Er^{3+}$, $Pr^{3+}$, $Gd^{3+}$, $Sm^{3+}$, $Tb^{3+}$, $Dy^{3+}$, $Tm^{3+}$ and $Yb^{3+}$. The metal oxide nanoparticle preferably should not have an appreciable absorption in the visible wavelength spectral range (herein defined as 400-700 nm). For the purposes of this description, no appreciable absorption is defined to mean having an extinction coefficient or absorptivity coefficient, $\epsilon$, of less than 100 $M^{-1}$ $cm^{-1}$. The metal oxide nanoparticle preferably should have a very strong absorption in the ultraviolet spectral range (herein defined as 10-400 nm). For the purposes of this description, very strong absorption is defined to mean having an $\epsilon$ value greater than $1 \times 10^5$ $M^{-1}$ $cm^{-1}$.

Lanthanide

The second material 106 is composed of a lanthanide ion that exhibits emission of light 112. Preferably, the second material exhibits emission of non-visible light such as ultraviolet light or near-infrared light. Suitable lanthanides (denoted generically as $Ln^{3+}$) include, for example, $Er^{3+}$, $Nd^{3+}$, $yb^{3+}$.

Linker

The linker compound 102 exhibits little or no absorption of UV, NIR or visible light and participates in a transfer of energy from the first material 100 to the second material 106.

Preferably, the linker compound 102 may be an organic molecule such as a hydrocarbon or an oxyhydrocarbon. It may be covalently or ionically bound to the metal oxide nanoparticle 100 and covalently bound to the chelator 104 portion of the taggant. Preferably, the properties of the linker 102 include:

1) Little if any absorption of light in the ultraviolet and in the visible spectrum (defined herein as less than 700 nm).
2) Permits energy transfer from the excited nanoparticle 100 (excited through absorption of light) to the lanthanide ion 106.
3) Little if any absorption in the NIR spectrum of interest (880-1550 nm) so as not to disrupt the signal coming from the $Ln^{3+}$ portion of the taggant.

The linker portion 102 of the taggant may have various structures. FIGS. 2A and 2B show two examples of suitable linker structures. In the figures, the integers $m_a$ and $m_b$ are in the range 0-8, preferably 0-5, most preferably 0-3. The integers n, $n_a$, $n_b$ and $n_c$ are in the range 0-5, preferably 0-3, most preferably 0-1. The integers $p_a$ and $p_b$ are in the range 0-10, preferably 0-8, most preferably 0-5. The symbol $R_1$ represents $-O(CH_2)_mCH_3$, $-(CH_2)_mCH_3$, $-CH_2CH(CH_2CH_3)(CH_2)_mCH_3$, or $-OCH_2CH(CH_2CH_3)(CH_2)_mCH_3$. The symbol X represents $-S(O)_2Y$, $-P(O)Y_2$, $-C(O)Y$, $-SiY_3$, $-NH_2$, $P(R_1)_3$, or $-N(R_1)_2$. The symbol Y represents $-OZ$, $-Cl$, $-OCH_3$, or $-OCH_2CH_3$. The symbol Z represents Li, Na, H, K, $NH_4$, $N(CH_3)_4$, $N(CH_2CH_3)_4$, ½ Ca, or ½ Mg, preferably Li, Na, H, K, $NH_4$, $N(CH_3)_4$, or $N(CH_2CH_3)_4$, and most preferably Li, Na, $NH_4$, or $N(CH_3)_4$. X is shown as the reactive portion of the linker used in order to functionalize the surface of the metal oxide nanoparticle. For example:

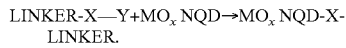

LINKER-X—Y+$MO_x$ NQD→$MO_x$ NQD-X-LINKER.

Chelator

The chelator compound 104 (FIG. 1) exhibits little or no absorption of UV, NIR or visible light and participates in a transfer of energy from the first material 100 to the second material 106. The properties of the chelator portion 104 of the molecule preferably include:

1) Little if any absorption of light in the ultraviolet and in the visible spectrum (i.e., wavelengths less than 700 nm).
2) Permits energy transfer from the excited nanoparticle to the lanthanide ion that is bound to the chelator portion of the taggant.
3) Little if any absorption in the NIR spectrum of interest (i.e., 880-1550 nm) so as not to disrupt the signal coming from the $Ln^{3+}$ portion of the taggant.

The chelator portion 104 of the taggant may have various structures. FIGS. 3A and 3B show two examples of suitable chelator structures, together with schematic representations of the lanthanide 302, linker 304, and functional group 306 portions of the molecule. In the figures, the lanthanide $Ln^{3+}$ may be, for example, ½ $Er^{3+}$, ½ $Nd^{3+}$, ½ $Yb^{3+}$, ⅓ $Er^{3+}$, ⅓ $Nd^{3+}$, ⅓ $Yb^{3+}$. The symbol Q represents $-CH_2-$, $-CH=CH-$, $-C\equiv C-$, $-O-$, $-N(R_1)-$, or $-NH-$. The symbols $R_2$ and $R_3$ each may represent $R_1$ (as discussed above in relation to FIGS. 2A and 2B) or another functional group.

Functional Group

The functional group 108 (FIG. 1) provides chemical functionality to the photoactive material. The functional group 108 exhibits little or no absorption of UV, NIR, or visible light (i.e., $\epsilon$<100 $M^{-1}$ $cm^{-1}$), and does not substantially inhibit the emission of light 112 exhibited by the second material 106.

The purpose of the functional group portion of the taggant is to introduce a chemical functionality that induces the desired solubility or adhesion for the final product. For instance, by placing carboxylate or sulfonate terminated groups within the functional group portion of the taggant, the taggant will be water soluble and ready for deposition using thermal inkjet conditions. By placing a long chain hydrocarbon, e.g., using a functional group $-(CH_2)_{17}CH_3$, at the terminus, the taggant becomes hydrophobic in nature and is readily soluble in vehicles readily designed for deposition through liquid electrophotography. The functional group plays an important role in the deposition method, as will be discussed in more detail below. Preferably, the properties of the taggant includes:

1) Exhibits little or no absorption of light in the ultraviolet and in the visible spectrum (i.e., below 700 nm).
2) Does not quench the luminescence of the lanthanide ion ($Ln^{3+}$) that is bound to the chelator portion of the taggant.
3) Does not absorb in the NIR spectrum of interest (i.e., 880-1550 nm) so as not to disrupt the signal coming from the $Ln^{3+}$ portion of the taggant.

Depostion Methods

In many cases, it is desirable to deposit the materials of the present invention on a surface. Different embodiments of the invention provide materials suitable for various different types of deposition methods.

Inkjet Formulation

Inkjet deposition may be performed through piezo inkjet (PIJ), continuous inkjet (CIJ) or thermal inkjet (TIJ) methods. In any of the cases, the main components are very similar with regards to the ink vehicle being used for delivery of the taggant.

The formulation of these inkjet inks according to embodiments of the present invention comprise a vehicle and either one taggant, or up to three different taggants (a taggant differentiation being provided by the emitting lanthanide ion—which in this case is $Er^{3+}$, $Nd^{3+}$, or $Yb^{3+}$) in various concentrations. All concentrations provided herein are expressed in weight percentages, unless indicated otherwise.

In one embodiment, aqueous inks comprise, by weight, from about 0.5 to about 20 wt % taggant, preferably from about 1 to about 10%, and more preferably from about 1 to about 6 wt % taggant; from about 1 to about 40 wt % of one or more organic solvent. More preferably, the fluids comprise from about 1 to about 25 wt % of at least one organic solvent with from about 5 to 15 wt % being the more preferable. Optionally, one or more water-soluble surfactants/amphiphiles may be present in the range of 0 to 40 wt %, preferably about 0.1 to about 5 wt %. The inks of this invention have a pH in the range of from about 4 to about 11, preferably from about 7 to about 10, and more preferably from about 8 to about 9. Selection of a suitable mixture of organic solvents depends on requirements of the specific application, such as the desired surface tension and viscosity, the selected taggant and reactive fluid, drying time of the ink-jet fluid, and the type of print medium onto which the fluid will be printed. For a discussion of inks and their properties, see The Printing Manual, 5th Ed., Leach et al. (Chapman and Hall, 1993). See also U.S. Pat. Nos. 2,833,736; 3,607,813; 4,104,061; 4,770,706; and 5,026,755.

Preferably, an ink suitable for inkjet deposition according to embodiments of the present invention have functional group with the structure $-R^4-NH_3Z'$, $-R_4-N(R_1)_3Z'$, or $-R_4-X'$; where $R_4$ has one of the structures shown in FIGS. 4A and 4B. X' has the structure $-SO_3Z$, $-PO_3Z_2$, $-CO_2Z$, $-N(R_1)_3Z'$, or $-NH_3Z'$; and Z' has the structure Cl, $PF_6$, $B(C_6H_6)_4$, Br, I, ½ $SO_4$, ⅓ $PO_4$, or $CH_3CO_2$.

The water soluble organic solvents suitably employed in the present ink-jet ink compositions include any of, or a mixture of two or more, of such compounds as nitrogen containing ketones, such as 2-pyrrolidinone, N-methyl-2-pyrrolidinone (NMP), 1,3-dimethylimidazolid-2-one, and octyl-pyrrolidinone; diols such as ethanediols (e.g., 1,2-ehanediol), propanediols (e.g., 1,2-propanediol, 1,3-propanediol), butanediols (e.g., 1,2-butanediol, 1,3-butanediol, 1,4-butanediol), pentanediols (e.g., 1,2-pentanediol, 1,5-pentanediol), hexanediols (e.g., 1,2-hexanediol, 1,6-hexanediol, 2,5-hexanediol), heptanediols (e.g., 1,2-heptanediol, 1,7-heptanediol), octanediols (e.g., 1,2-octanediol, 1,8-octanediol); triols such as 2-ethyl-2-hydroxymethyl-1,3-propanediol and ethylhydroxypropanediol (EHPD); and glycol ethers and thioglycol ethers, commonly employed in ink-jet inks such as polyalkylene glycols such as polyethylene glycols (e.g., diethylene glycol (DEG), triethylene glycol, tetraethylene glycol), polypropylene glycols (e.g., dipropylene glycol, tripropylene glycol, tetrapropylene glycol), polymeric glycols (e.g., PEG 200, PEG 300, PEG 400, PPG 400) and thiodiglycol. Preferably 2-pyrrolidinone, NMP, DEG, EHPD and 1,5-pentanediol are employed in the practice of this invention with 2-pyrrolidinone, DEG and 1,5-pentanediol being the most preferred solvents.

Suitable surfactants may be nonionic or anionic when used in the fluid vehicle. Examples of suitable nonionic surfactants include, secondary alcohol ethoxylates (e.g., Tergitol series available from Union Carbide Co.), nonionic fluoro surfactants (such as FC-170C available from 3M), nonionic fatty acid ethoxylate surfactants (e.g., Alkamul PSMO-20 available from Rhone-Poulenc), fatty amide ethoxylate surfactants (e.g., Aldamide L-203 available from Rhone-Poulenc), and acetylenic polyethylene oxide surfactants (e.g., Surfynol series, available from Air Products & Chemicals, Inc.). Examples of anionic surfactants include alkyldiphenyloxide surfactants (such as Calfax available from Pilot), and Dowfax (e.g., Dowfax 8390 available from Dow), and fluorinated surfactants (Fluorad series available from 3M).

Cationic surfactants may be used in the reactive fluid which interacts with the ink vehicle and/or taggant. Cationic surfactants that may be used include betaines (e.g., Hartofol CB-45 available from Hart Product Corp., Mackam OCT-50 available from McIntyre Group ltd., Amisoft series available from Ajinomoto), quaternary ammonium compounds (e.g., Glucquat series available from Amerchol, Bardac and Barquat series available from Lonza), cationic amine oxides (e.g., Rhodamox series available from Rhone-Poulenc, Barlox series available from Lonza) and imidazoline surfactants (e.g., Miramine series available from Rhone-Poulenc, Unamine series available from Lonza).

Buffers may be used to modulate pH and they can be organic based biological buffers or inorganic buffers such as sodium phosphate. Furthermore, the buffer employed should provide a pH ranging from about 4 to about 9 in the practice of the invention. Examples of preferably employed organic buffers include Trizma base, available from companies such a Aldrich Chemical (Milwaukee, Wis.), 4-morpholinoethane-sulfonic acid (MES) and 4-morpholinopropanesulfonic acid (MOPS).

Any of the biocides commonly employed in ink-jet inks may be employed in the practice of these embodiments, such as NUOSEPT 95, available from Hals America (Piscataway, N.J.); Proxel GXL, available from Avecia (Wilmington, Del.), and glutaraldehyde, available from Union Carbide Company (Bound Brook, N.J.) under the trade designation UCARCIDEW 250. Proxel GXL is the preferred biocide.

In addition to the ink vehicle containing the taggant which may be dispensed either separately (as a function of particle size of the $MO_x$ NQD and of the emitting functionality, $Ln^{3+}$) or together in a given ratio of components for a mixed signal emission or absorption profile, the ink may also be dispensed with a reactive fluid which may be printed before or after the ink vehicle containing the taggant. The reaction between the reactive fluids may employ one of several reactive mechanisms well-known in the art such as the use of a pH-sensitive taggant, or the use of a precipitating agent as disclosed in U.S. Pat. No. 5,181,045 (entitled, "Bleed Alleviation using pH Sensitive Dyes/Inks"), U.S. Pat. No. 5,785,743 (entitled, "Bleed Alleviation in Ink-Jet Inks using Organic Acids"), U.S. Pat. No. 5,679,143 (entitled, "Bleed Alleviation in Ink-Jet Inks using Acids Containing a Basic Functional Group"), U.S. Pat. No. 5,428,383 (entitled, "Method and Apparatus for Preventing Color Bleed in a Multi-Ink Printing System), U.S. Pat. No. 7,066,590 (entitled, "Ink and Underprinting Fluid Combinations with Improved Inkjet Print Image and Color Stability") and U.S. Pat. No. 6,281,269 (entitled, "Fluid Set for Ink-Jet Printers").

The purpose of the reactive fluid is to interact with the ink vehicle containing the taggant, or with the taggant itself, in order to immobilize it towards the surface of the material onto which it has been deposited. It is also used to control the bleed of the taggant, preventing it from spreading to other portions of the substrate onto which it has been deposited. Examples of immobilizing agents that may be included in the reactive fluid include: precipitating agents such as inorganic salts (preferably divalent or trivalent salts of chloride and/or nitrate such as $Mg(NO_3)_2$, $Ca(NO_3)_2$, $CaCl_2$, $MgCl_2$, $AlCl_3$, $AlCl_3$, $Al(NO_3)_2$ and the hydrates of these agents, organic acids such as succinic acid, citric acid, glutaric acid, morpholinoethane sulfonic acid, boronic materials such as boric acid and the ammonium or sodium salts of borates, cationic surfactants such as Unamine O (available from Lonza) and dodecyltrimethylammonium chloride, and polymeric cationic reagents such as acidified PEI, poly(allyldimethyl)ammonium chloride, and acidified poly(allylamine). The components of the reactive ink vehicle are identical to those used for the taggant ink vehicle with the exception that anionic surfactants should not be used in the formulation.

Other materials used to help create permanence, prevent kogation (residue buildup on the printhead of the inkjet), or other materials may be used as known to those skilled in the art, as long as there are no incompatibilities associated with its use with the described taggant.

Liquid or Dry Electrophotography

Deposition using electrophotography may be performed using either dry or wet methods. In this context, the terms 'dry' and 'wet' refer to the state of the toner as it is being applied after development of an 'electronic' image on the roller drum. Depending on the mode of delivery, the functional group may be terminated with either a positive charge or a negative charge and used as a charge director for the imaging to occur. The use of a negative charge at the terminus of the taggant ($X'=-CO_2^-$, $-PO_3^{2-}$, $-SO_3^-$, etc.) will lead to a positive image on the roller drum whereas the use of a positive charge at the terminus of the taggant ($X'=-NH_3^+$, $N(R_1)_3^+$, etc.) will lead to a negative image on the roller drum. The image on the roller drum is formed through electrostatic interaction with an induced negative charge placed on the roller through a mechanism using Corona discharge or a similar mechanism. The drum itself contains a buried photoconductive compound which generates an electron-hole pair upon irradiation of the desired light (monochromatic laser). The electron of this pair is then drawn off through the backside of the drum through a large positive potential placed on the backside, allowing the positive charge to travel to the surface of the drum and annihilate a given negative charge. This creates an image on the drum.

Figure 5A:
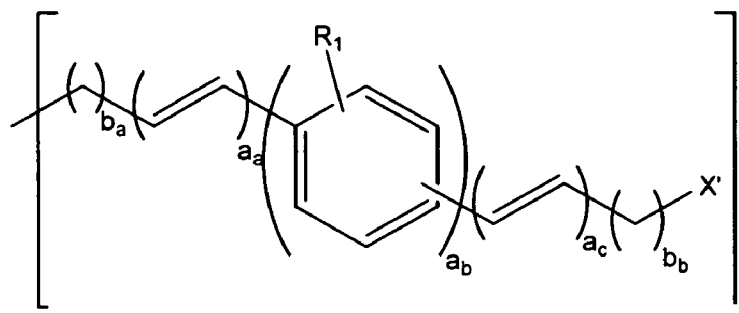
FIGS. 5A and 5B are chemical structures for portions of two alternative functional groups of a taggant material suitable for electrophotographic deposition according to an embodiment of the present invention.
Figure 5B:
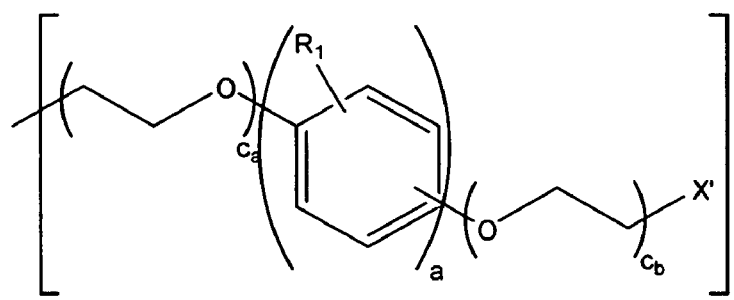

The functional group structure portion of the taggant with regards to the use of the taggant in an electrophotographic application (wet or dry) may have, for example, the structure shown in FIG. 5A or 5B, where a, $a_a$, $a_b$ and $a_c$ are integers in the range 0-1; $b_a$ and $b_b$ are integers in the range 1-18; and $c_a$ and $c_b$ are integers in the range 1-50.

The taggant may be used in the formulation in 10-50 wt %, with the rest of the component makeup of the vehicle being: long chain surfactants of the appropriate charge (same charge as the taggant) to act as charge directors, charged polymeric materials containing similar charge as the surfactants for both adhesion purposes and matrix development of the printed ink (creating sheen, permanence and encapsulation of the printed taggant), and in the case of liquid electrophotography, a vehicle such as α-terpineol or isopar. The composition is dependent upon the processing temperature associated with the printer, the ease needed for transfer from roller to roller, and the substrate on which the printing is occurring.

Aerosol Deposition

Delivery by an aerosol may take place by using the following formulation: taggant containing the functional group described below of 5 to 50 wt %, propane of 10 to 15 wt %, butane of 10 to 15 wt %, toluene of 1 to 3 wt %, medium weight hydrocarbons such as ethylbenzene, naphthalene, xylenes of 1 to 10 wt %, acetone of 30 to 60 wt %, and isobutyl acetate or ethyl 3-ethoxyproprionate of 2 to 10 wt %.

Figure 6A:
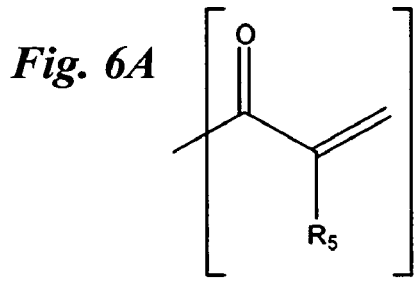
FIGS. 6A, 6B, 6C are chemical structures for alternative functional group portions of a taggant suitable for aerosol deposition according to an embodiment of the present invention.
Figure 6B:
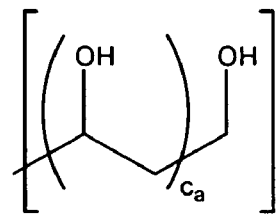
Figure 6C:
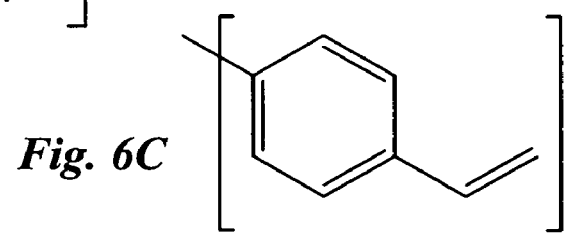

FIGS. 6A, 6B, 6C show several alternative structures of the functional group portion of the taggant with regards to the use of the taggant being dispersed by an aerosol, where $R_5$ represents —H, or —CH$_3$.

Arrays, Readout Methods and Use

Security inks of different types may be deposited on a surface to form arrays of dots or other patterns. The use of different types of inks provides a host of security features, as will be illustrated by the following examples.

Figure 7:
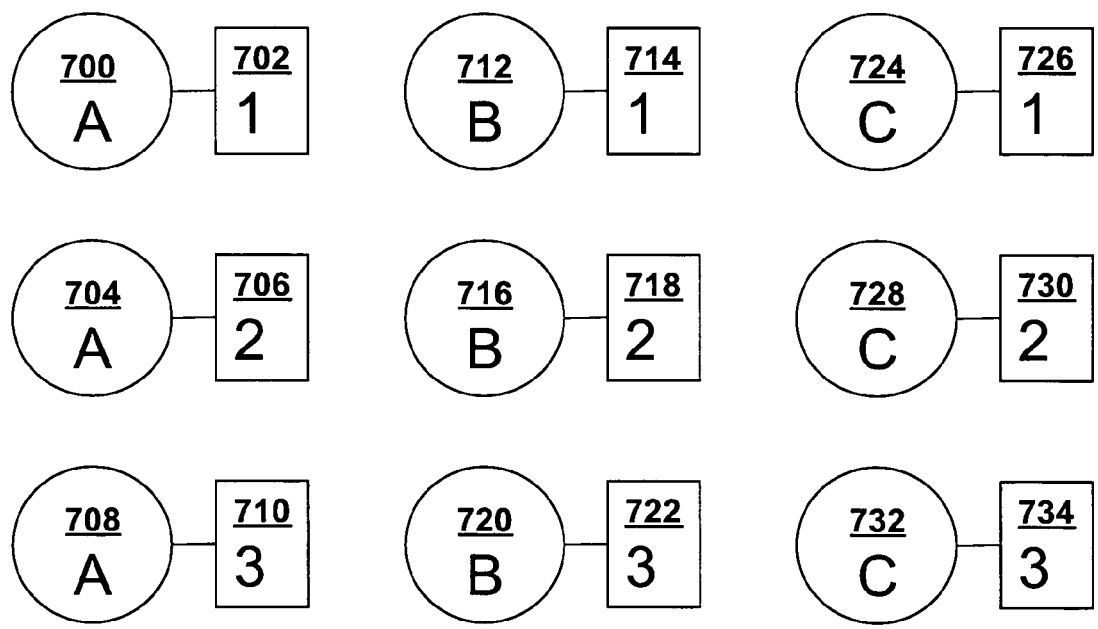
FIG. 7 is a pattern of security ink dots of different types, providing multiple types of encoding according to an embodiment of the present invention.

Consider a 3×3 array of nine dots, as shown schematically in FIG. 7. Each dot is composed of a security ink of a different type, where the type is determined by the lanthanide and the size of the nanoparticle. In this example, the nine different security inks have nanoparticles whose sizes are small, medium, and large, denoted by A, B, C, respectively. Each of these can be paired with one of three lanthanides ($Nd^{3+}$, $Yb^{3+}$ and $Er^{3+}$), denoted 1, 2, 3. The pairing of three sizes with three lanthanides gives nine distinct formulations, denoted A1, A2, A3, B1, B2, B3, C1, C2, C3.

As illustrated in FIG. 7 and shown in Table 1, ink A1 is composed of a small nanoparticle 700 paired with $Nd^{3+}$ 702. Ink A2 is composed of a small nanoparticle 704 paired with $Yb^{3+}$ 706. Ink A3 is composed of a small nanoparticle 708 paired with $Er^{3+}$ 710. Ink B1 is composed of a medium nanoparticle 712 paired with $Nd^{3+}$ 714. Ink B2 is composed of a medium nanoparticle 716 paired with $Yb^{3+}$ 718. Ink B3 is composed of a medium nanoparticle 720 paired with $Er^{3+}$ 722. This simple 3×3 array of nine different ink types may be used to illustrate various types and levels of security, as follows.

TABLE 1

Defining dots within the array by $MO_x$ NQD size and by NIR emitter type.

| Label | NQD Size | Emitter | Label | NQD Size | Emitter | Label | NQD Size | Emitter |
|---|---|---|---|---|---|---|---|---|
| A1 | Small | $Nd^{3+}$ | B1 | Medium | $Nd^{3+}$ | C1 | Large | $Nd^{3+}$ |
| A2 | Small | $Yb^{3+}$ | B2 | Medium | $Yb^{3+}$ | C2 | Large | $Yb^{3+}$ |
| A3 | Small | $Er^{3+}$ | B3 | Medium | $Er^{3+}$ | C3 | Large | $Er^{3+}$ |

EXAMPLE 1a

The first type of security is provided by the simple fact that the inks are all solar-blind materials. Both absorbtion (interrogation) and emission (readout) are invisible. This establishes the first layer of security. If the dots are excited by suitable UV light, then they will all emit light in the NIR region of the spectrum. Although the entire pattern of dots may then be seen using a broad spectrum NIR-sensitive detection system, it remains invisible to the naked eye.

EXAMPLE 1b

As just discussed above, if all the dots are excited by suitable UV light, then all will emit light in the NIR spectrum. Because the three rows of dots have different lanthanides, however, the light emitted from the three rows will be different. Consequently, detection using a monochromatic NIR vision system can distinguish these differently encoded rows from each other. For example, if 1340, 1060 or 880 nm is monitored, then only those dots containing material with $Nd^{3+}$ emitters (i.e., the top row) will be detected upon irradiation. If 980 nm is monitored, then only those dots containing material with the Yb3+ emitters (i.e., the middle row) will be detected. If 1550 nm is monitored, then only those dots containing material with the $Er^{3+}$ emitters (i.e., the bottom row) will be detected. By controlling the placement of these different types of dots, different patterns can be encoded and detected. For example, a bar code could be implemented by suitable arrangement of stripes or rows of dots.

EXAMPLE 2

Another type of security is provided by the excitation wavelength. In the previous examples, the excitation (interrogation) light excited all the dots in the array. However, additional security and encoding may be provided by taking advantage of the dependence of nanoparticle excitation properties upon nanoparticle size. Because of the quantum confinement effects exhibited through the use of quantum dots or quantum materials, the size of the nanoparticle has a large effect upon the absorption spectrum of the material. The larger the quantum dot, the broader its absorption spectrum (absorbing more light over a larger spectrum). The smaller the quantum dot, the more energy needed to induce exciton formation within the quantum dot, and the smaller the spectrum available for this excitation.

Use of this property of these metal oxide nanoparticles enables the selective excitation, and hence, emission of the quantum dots based on size. For example, high energy UV-A light will excite small, medium and large sized nanoparticles, producing the results discussed above in examples 1a and 1b. UV-B light, however, will excite only medium and large size nanoparticles (i.e., the middle and right columns of dots in the array), and UV-C light will excite only large nanoparticles (i.e., the right column of dots). Used with a broad-spectrum NIR detector, the selection of a specific interrogating light wavelength provides another type of encoding for the pattern of dots. Moreover, the selective interrogation and selective detection can be used in conjunction with each other to provide a combined encoding scheme. For example, UV-C interrogation of the array together with detection at 1550 nm will detect just the single dot C3.

In addition, by mixing the relative concentrations of the different ink types, the relative emission intensities can be controlled to provide a further level of encryption. Digital deposition methods or pre-mixing of different emitters and absorbers can be used to obtain a concentration-dependent emission and absorption profile associated with the material.

Security inks deposited on surfaces can have spatial modulation of invisible patterns such as bar codes, and these patterns can be provided with additional layers of encoding by variations of excitation (interrogation) wavelength coding modulation, emission (readout) wavelength coding modulation, and intensity modulation. Combining these techniques provides a highly complex, multi-layered security encoding.

CONCLUSION

The materials and techniques provided by embodiments of the present invention enjoy many advantages over prior materials and techniques. Embodiments provide materials that are solar-blind, i.e., not activated or detected in the visible spectrum. The materials are low cost and do not have adverse environmental impact. The materials can be deposited on surfaces using a variety of different methods including, for example, aerosol dispersement, inkjet (thermal, piezo, continuous, etc.), electrophotography (wet and dry), and various types of offset printing applications. By controlling the nanoparticle size, the excitation wavelength can be selected or tuned to a desired wavelength. The nanoparticles have high stability, especially when compared to dye molecules. The materials are more resistant to degradation when exposed to extreme environmental conditions. The emission bands are strong and narrow, and can be controlled independent of the excitation wavelengths. Several methods and levels of encoding are available for use alone or in combination.

The invention claimed is:

1. A photoactive material comprising:
   a first material comprising a wide-gap semiconductor nanoparticle, wherein the first material exhibits absorption of non-visible light and no appreciable absorption of visible light;
   a second material comprising a lanthanide ion, wherein the second material exhibits emission of light;
   a linker compound bonded to the first material;
   a chelator compound covalently bonded to the linker and bonded to the second material; and
   a functional group bonded to the chelator compound providing chemical functionality to the photoactive material;
   wherein the linker compound and chelator compound each exhibits no absorption of UV, NIR or visible light and participates in a transfer of energy from the first material to the second material, wherein the energy is derived from the non-visible light absorbed by the first material;
   wherein the functional group exhibits no absorption of UV, NIR, or visible light, and does not inhibit the emission of light exhibited by the second material.

2. The photoactive material of claim 1 wherein the first material exhibits absorption of ultraviolet light.

3. The photoactive material of claim 1 wherein the wide-gap semiconductor nanoparticles comprise metal oxide nanoparticles.

4. The photoactive material of claim 1 wherein the second material exhibits emission of non-visible light.

5. The photoactive material of claim 1 wherein the second material exhibits emission of near-infrared light.

6. The photoactive material of claim 1 wherein the linker compound is an organic molecule selected from the group consisting of a hydrocarbon and an oxyhydrocarbon.

* * * * *